United States Patent [19]

Childress

[11] Patent Number: 5,494,350

[45] Date of Patent: Feb. 27, 1996

[54] ROTATING COMPOSTER HAVING A WIDE CONNECTING COLLAR

[76] Inventor: Ellen C. Childress, 105 Green St., Reading, Mass. 01867-3211

[21] Appl. No.: 196,715

[22] Filed: Feb. 14, 1994

[51] Int. Cl.[6] ...................................................... B01F 9/02
[52] U.S. Cl. .......................... 366/226; 366/220; 220/4.04; 220/4.26
[58] Field of Search ..................... 366/14, 15, 45, 366/53, 54, 62, 63, 130, 219, 220, 225–229, 235; 220/4.04, 4.05, 4.12, 4.26, 912

[56] References Cited

U.S. PATENT DOCUMENTS

| | | | |
|---|---|---|---|
| 200,997 | 3/1878 | Farmer | 366/220 |
| 227,239 | 5/1880 | Frentress | 366/220 |
| 391,520 | 10/1888 | Duecker | 366/225 |
| 957,398 | 5/1910 | Wilcox | 366/220 |
| 1,674,296 | 6/1928 | Peters et al. | 220/4.26 |
| 2,496,077 | 1/1950 | Wehner | 366/225 X |
| 2,782,913 | 2/1957 | Devick | 220/4.26 X |
| 3,341,183 | 9/1967 | Bergstrom et al. | 366/225 |
| 4,372,686 | 2/1983 | Herfeld | 366/220 |
| 4,589,643 | 5/1986 | Breum | 220/4.12 |

FOREIGN PATENT DOCUMENTS

| | | | |
|---|---|---|---|
| 1330444 | 5/1963 | France | 366/219 |
| 1144227 | 2/1987 | U.S.S.R. | 366/220 |
| 694550 | 7/1953 | United Kingdom | 366/54 |
| 1574303 | 9/1980 | United Kingdom | 366/54 |

*Primary Examiner*—Charles E. Cooley
*Attorney, Agent, or Firm*—Ellen C. Childress

[57] ABSTRACT

A closed container for rotating compost is formed by connecting the open end of two buckets together with a collared connector. The collar has pivotal connection to a frame for supporting the container during rotation. The depth of the collar is close the depth of a bucket.

2 Claims, 5 Drawing Sheets

5,494,350

ROTATING COMPOSTER HAVING A WIDE CONNECTING COLLAR

Compost is a mixture of rotting organic matter. Compost is a convenient and efficient fertilizer. Compost heaps are piles of organic matter left to rot and and are generally turned over at regular intervals to ensure uniform decay as well as to better distribute air and moisture. Matter from a regularly turned compost heap can be used after four to six months.

As landfills and incinerators are increasingly regulated and expensive, composting of materials such as leaves, kitchen waste and grass clippings becomes economical and necessary. However, a compost heap can be unsightly, smelly, and, if improperly cared for, attractive to undesirable insects and animals. To this end, several commercial compost "bins" have been made available. Most consist of side walls with an optional cover. Such bins, however, do not address the heavy work of turning and mixing the material.

A rotating composter is available from Gardeners Supply, under the brand name GREEN MAGIC compost tumbler. This composter speeds dramatically the time which is necessary for using the composted material, to three to 4 weeks. This composter contains the compost and keeps the composting material neatly contained. While an excellent improvement, it has drawbacks. It is the most expensive composter sold in the catalog and takes up significant storage space. There is no place to put new waste during the composting period, and to empty the composter, it is tilted down to the ground, requiring the user to transfer the finished compost to a container by lifting or shoveling.

Rotating mixers are also used for other purposes such as mixing cement. Cement tends during the mixing operation to form a clump which must be broken up in order to insure a uniform mix.

A number of ribbed pails or buckets are commercially available, and generally are provided with a snap on lid. Such buckets are used to ship and store materials such as pastry filling and powdered soap. Generally in the United States such buckets are 3 to 5 gallons, and the buckets after use represent an expensive disposal problem for the primary user. The reuse of such containers by a secondary users is facilitated by uniformity of the containers. The diameter of the lid is generally greater than that of the base.

SUMMARY OF THE INVENTION

A closed container for a rotating composter or mixer is formed by connecting the open end of two buckets together. The connector is pivotally connectable to a frame for supporting the container during rotation. For use as a mixer of materials which tend to clump, a baffled connector to break up clumps can be used. Since finished compost is contained in a bucket, accessories to adapt the container for container gardening are presented along with a snap on sieve for sifting finished compost.

FIGS. (4A and 4B) is a perspective view of the container and frame ready for use.

Figure 5:
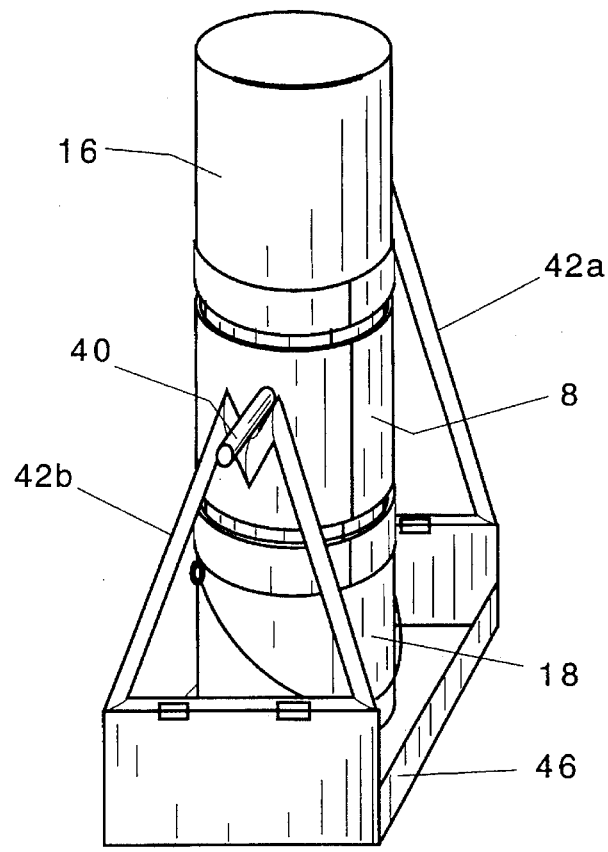

FIG. 5 is a perspective view of a bucket ready for tumbling.

Figure 6:
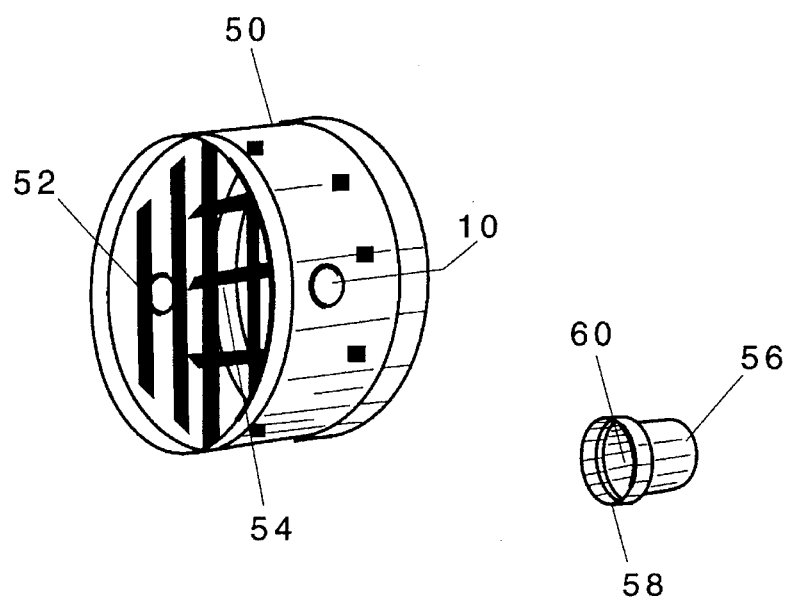

FIGS. 6A and 6B is a perspective view of a connector having baffles.

Figure 7:
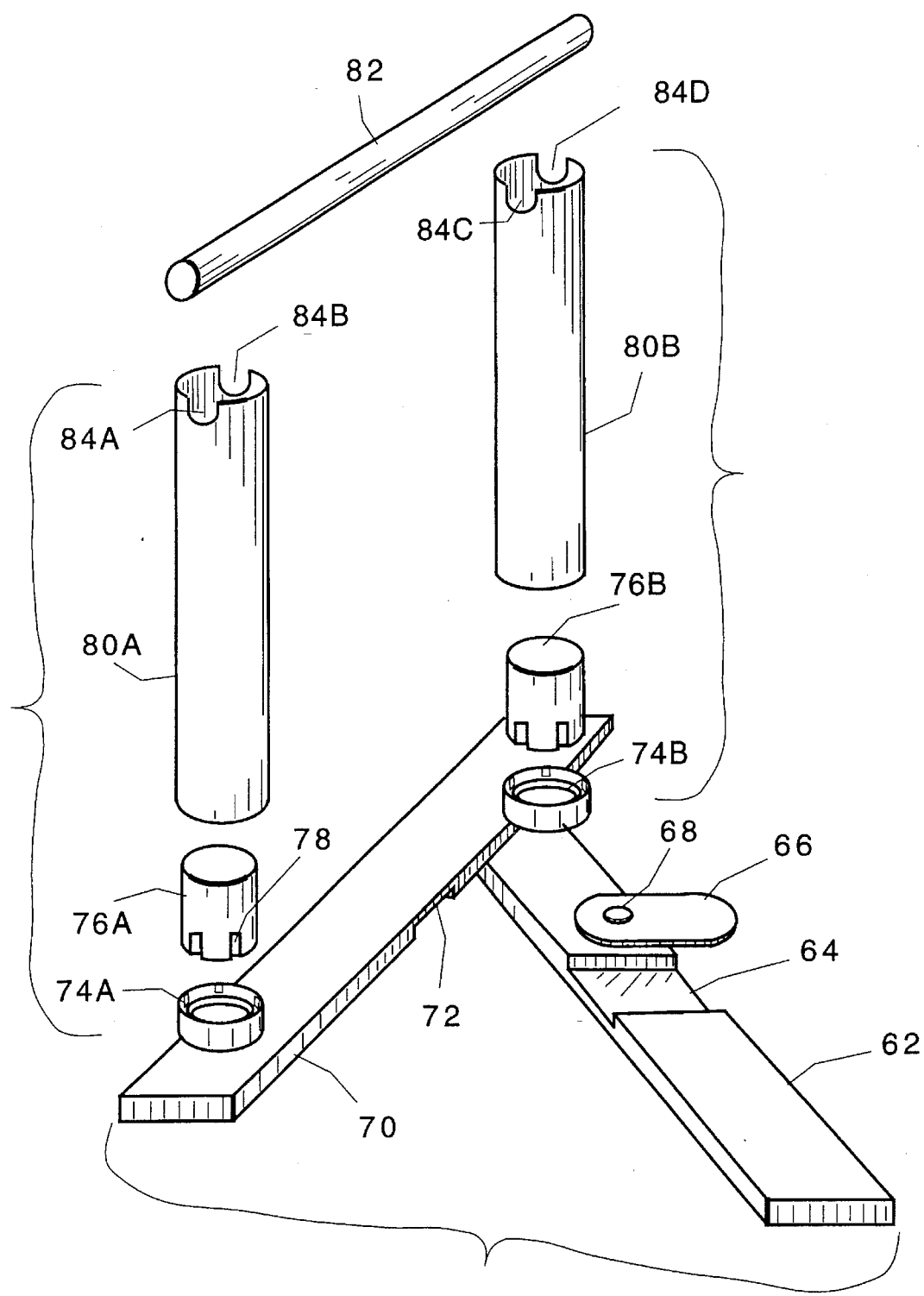

FIG. 7 is a perspective exploded view of an alternate frame for a container.

DETAILED DESCRIPTION OF THE INVENTION

Figure 1:
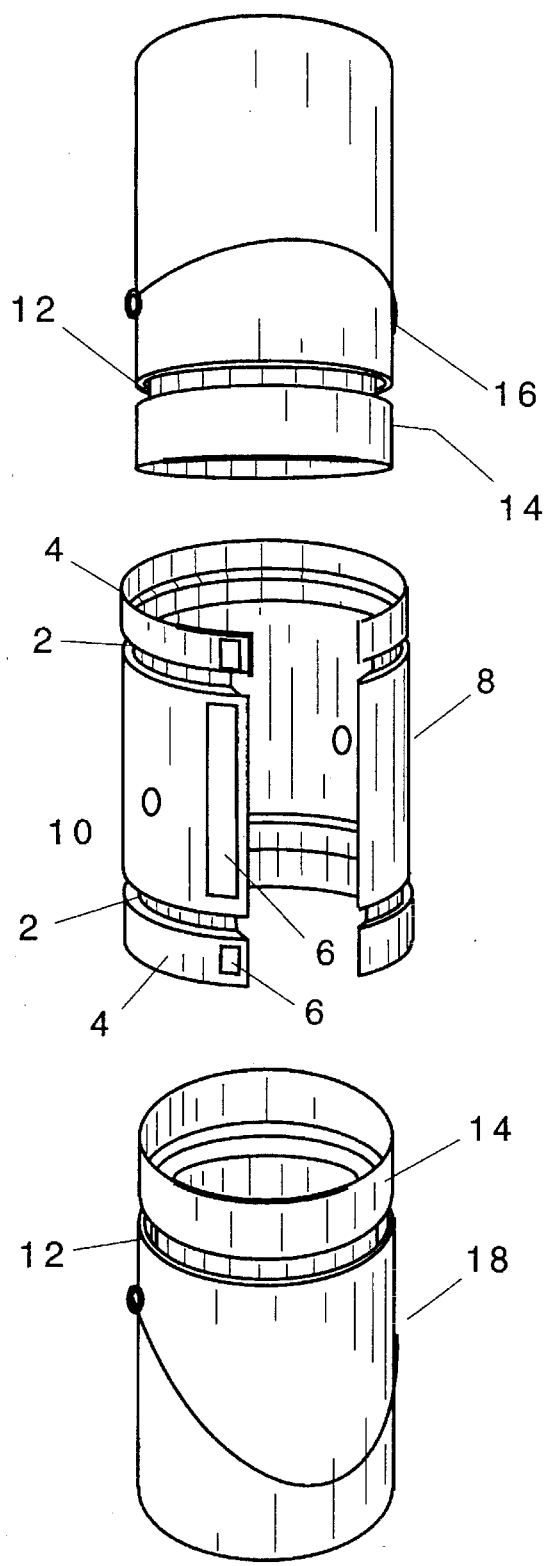
FIG. 1 is an exploded perspective view of the container.
Figure 4:
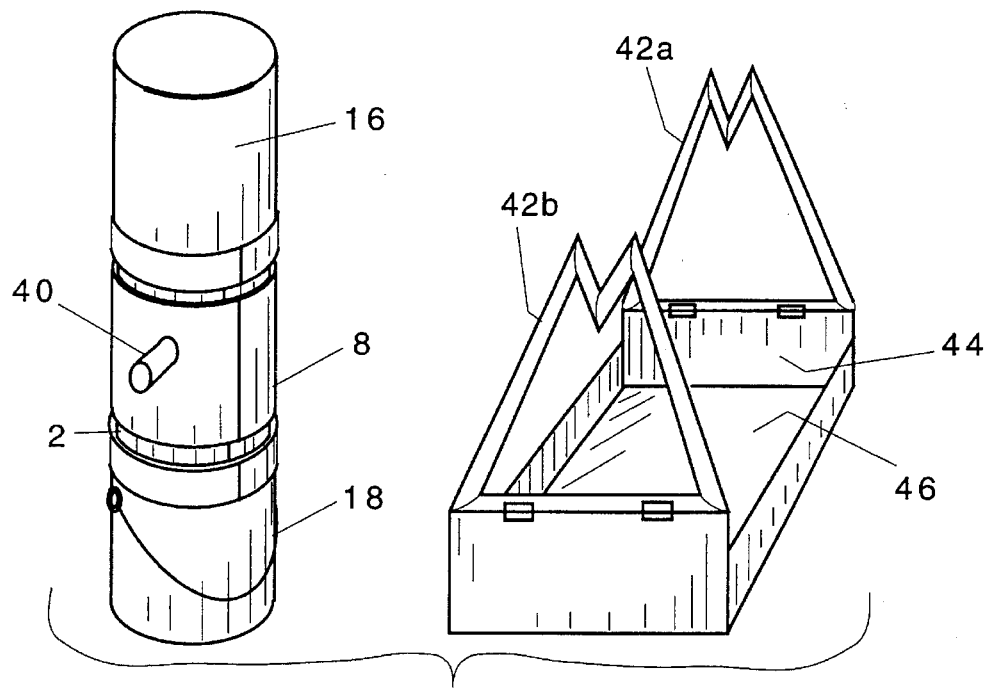

To use the container of FIG. 1, a collar 8 is wrapped around a first ribbed bucket 18 and the collar 8 is secured with a fastener 6 such as hook and loop fasteners available under the brand name VELCRO. The indent 2 of the collar 8 matches the indent 12 of the bucket, and secures the bucket between the upper rib 14 and the bucket body. The collar 8 has an optional sleeve 4 which is preferably provided with a gasket to contain any leakage, should the compost be wet. Waste material such as leaves, kitchen waste or manure is added to the collared bucket to a level somewhat below the upper indent 2. At this point the upper bucket 16 is secured upside down into the upper portion of the collar 8 and secured with the fasteners 6. Buckets 16 and 18 each have a mouth which are the same size and shape. The collar 8 has a depth about equal to the depth of the bucket 18. The volume of space defined by the collar 8 approximates the volume defined by the bucket 18. Holes 10 or projections are provided to suspend the container shown in FIG. 4A pivotally by pivot support rod 4D in the frame shown in FIG. 4B when it is ready for rotation. For composting, rotation every 3 to 4 days is satisfactory. By using an independent frame which suspends the containers, a single frame may be used with a large number of containers, decreasing both the cost and needed storage for maintaining multiple containers. Many frames are possible, and an ideal frame would collapse or fold for easy storage, be light and easy to move; be stable; and eliminate any need for hand lifting of a full container. The frame of FIG. 4 has M shaped tubular container supports 42a, 42b which are attached to a base 46 by locking hinges 44. An alternative frame which can be stored in a small area is shown in FIG. 7. When placed in the frame as shown in FIG. 5, the bucket assembly is easily turned, turning the compost and mixing it thoroughly.

Figure 2A:
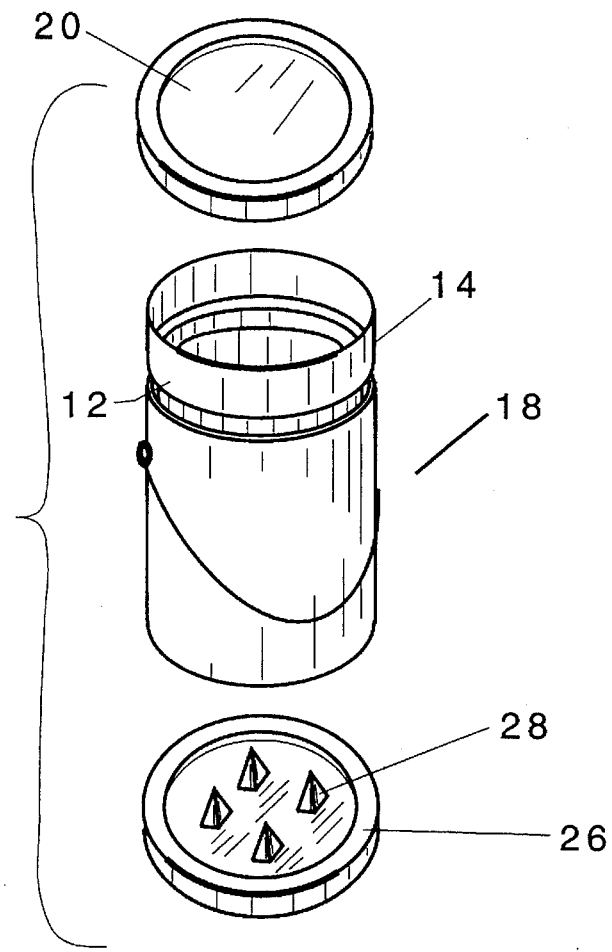
FIGS. 2A and 2B is a perspective view of accessories for use with a bucket of finished compost.
Figure 2B:
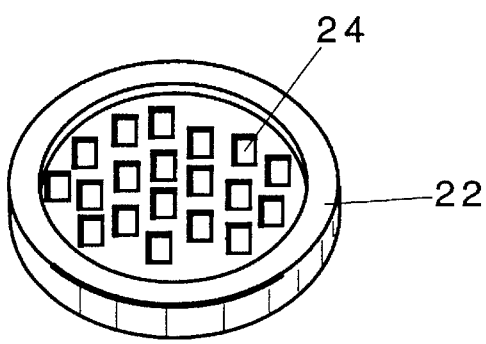
Figure 3:
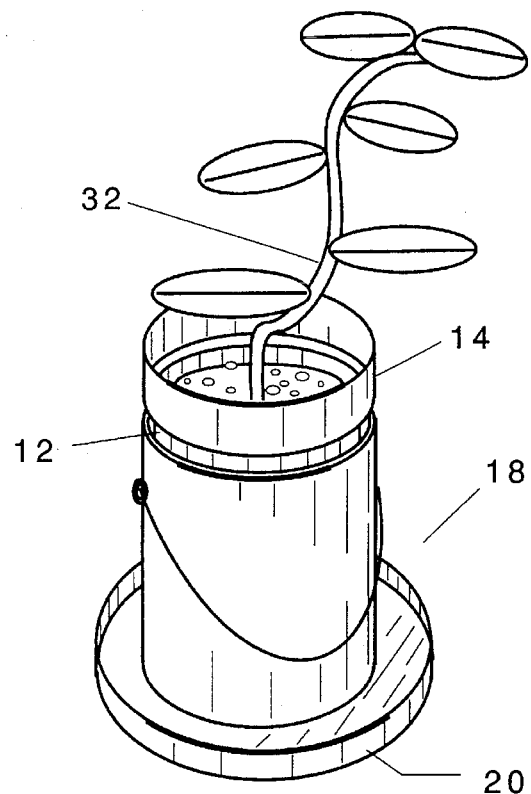
FIG. 3 is a perspective view of a bucket used for container gardening.

The ribbed bucket 18 have snap on lids 20 as shown in FIGS. 2A and 2B which are greater in diameter than the base of the bucket 18. Since, after the composting process is complete, the finished compost is contained in the bucket, and since it is often desirable to screen the compost, the user of the composter would find it convenient to have a snap on lid 22 with holes 24. Then when compost is dispensed from the bucket, it is screened, eliminating any large stones which may have gotten into the compost mixture. Ideally, the screen is provided with an outer ridge which engages the snap on lid 20.

compost is a prime ingredient in container gardens, and since the compost is already in a container 18 is convenient to grow plants 32 in the bucket 18 of finished compost as shown in FIG. 3. However, the buckets have no holes in the base for drainage necessary for healthy plants 32. Therefore a hole making device having a diameter similar to the lid 20 is desirable. Such a device is shown in FIG. 2A. It is a disc 26 having sharp projections 28 on it. To use, the bucket 18 is placed on the projections 28, and pressure is applied downward. A easy way of applying this pressure is to place a lid 20 on the bucket and sit on the lid. Afterwards, the lid 20 can be used as a saucer as shown in FIG. 3.

The frame of FIG. 7 can be easily disassembled for transport. The base is composed of two boards 62, 70 arranged at right angles. The boards have interlocking recessed 64, 72 cut into them. To provide further stability, the lower board 62 has a projection 66 which is attached with a pivot 68. When to two boards 62,70 are interlocked, the projection 66 is positioned over the upper board 72. Two container caps 74A, 74B are fixed to the upper board by glue or a fastener. Containers 76A and 76B which have interlocking projections 78 are locked into the caps. Plastic pipes 80A, 80B having notches 84A, 84B, 84C and 84D and an inner diameter close to that of the containers 76A, 76B are placed on the containers 76A, 76B. A dowel 82 having a diameter close to that of the collar holes 10 is placed through the collar so as to engage each of the holes 10, and then rested in the notches 84A, 84B, 84C, and 84D. Then the container is easily turned.

If the user lacks a frame, the container assembly could conceivably be hung, suspended by two rope loops.

Rotating containers can be used for other purposes than composting. For example cement is commonly mixed in a rotating drum. For small amounts, the homeowner will often use a wheelbarrow, which results in cleaning difficulty. The amount of cement which can be contained in a single ribbed bucket is ideal form many small projects, however, a collar for cement mixing must be thick, and very securely fastened. It is therefor believed that a one piece snap on collar 50 such as is shown in FIG. 6A is desirable. A second problem, is that cement tends to clump, and would therefore mix unevenly in the composter previously described. Therefore some means of breaking up the clump is needed. This could be baffles or wires as is shown in FIG. 6A. FIG. 6A shows a first set of wires 54 and an orthogonally oriented second set of wires 52. The liquid used for mixing cement and the finer grit would leak out if holes 10 were left open. Accordingly plugs such as are used for attaching wheels to children's wagons can be placed in the holes. Such a plug is shown having a cul-de-sac 56, an open end 60 and a rim 58 for retaining the plug. Alternatively, knobs could be formed on the collar which rest in notches.

By using a connector with a rotator, two containers can be joined to form a larger closed container which can be rotated to mix the contents.

What is claimed:

1. A rotating composter comprising:

a first bucket having a first mouth and a depth, wherein the area of said mouth times the depth of said bucket defines a first volume; a second bucket having a second mouth, said second mouth having the same size and shape as said first mouth; a connecting collar having a collar depth about equal to said first bucket depth and having a first end and a second end, said first mouth being engagable by said first collar end and said second mouth being engagable by said second collar end, for coupling said first bucket mouth to said second bucket mouth, wherein the volume of space defined by said collar approximates the first volume defined by said first bucket; and means for pivotally suspending said coupled buckets, said means being located on said collar; wherein said first and second buckets each have a ridge encircling a respective bucket near the bucket mouth thereof and wherein said collar has an indent for engaging each of said ridges.

2. The composter of claim 1 wherein said collar comprises a sheet having opposing edges, said sheet wrapping around said bucket mouths and having means for securing the opposing edges of the sheet to form a cylindrical collar.

* * * * *